United States Patent [19]

Zaromb et al.

[11] Patent Number: 5,286,465
[45] Date of Patent: Feb. 15, 1994

[54] HYDROMETALLURGICAL PROCESS FOR RECOVERING IRON SULFATE AND ZINC SULFATE FROM BAGHOUSE DUST

[76] Inventors: Solomon Zaromb, 95706 William Dr., Hinsdale, Ill. 60521; Daniel B. Lawson, 925 Putnam Dr., Lockport, Ill. 60441

[21] Appl. No.: 905,330

[22] Filed: Jun. 29, 1992

[51] Int. Cl.$^5$ .......................... C22B 7/02; C22B 3/08
[52] U.S. Cl. ................................. 423/106; 423/109; 423/146; 423/530; 423/541; 75/961
[58] Field of Search ............... 423/106, 109, 146, 150, 423/DIG. 2, 530, 541 A; 75/961

[56] References Cited

U.S. PATENT DOCUMENTS

| | | | |
|---|---|---|---|
| 3,375,069 | 3/1968 | Duval | 423/150.3 |
| 3,676,107 | 7/1972 | Barnard et al. | 75/961 |
| 4,176,160 | 11/1979 | Payonet | 423/35 |

Primary Examiner—Melvyn J. Andrews

[57] ABSTRACT

A process for recovering zinc/rich and iron-rich fractions from the baghouse dust that is generated in various metallurgical operations, especially in steel-making and other iron-making plants, comprises the steps of leaching the dust by hot concentrated sulfuric acid so as to generate dissolved zinc sulfate and a precipitate of iron sulfate, separating the precipitate from the acid by filtration and washing with a volatile liquid, such as methanol or acetone, and collecting the filtered acid and the washings into a filtrate fraction. The volatile liquid may be recovered distillation, and the zinc may be removed from the filtrate by alternative methods, one of which involves addition of a sufficient amount of water to precipitate hydrated zinc sulfate at 10° C., separation of the precipitate from sulfuric acid by filtration, and evaporation of water to regenerate concentrated sulfuric acid. The recovery of iron may also be effected in alternative ways, one of which involves roasting the ferric sulfate to yield ferric oxide and sulfur trioxide, which can be reconverted to concentrated sulfuric acid by hydration. The overall process should not generate any significant waste stream.

15 Claims, 1 Drawing Sheet

HYDROMETALLURGICAL PROCESS FOR RECOVERING IRON SULFATE AND ZINC SULFATE FROM BAGHOUSE DUST

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

This invention relates to a hydrometallurgical process for recovering iron and zinc from the baghouse dust that is generated in steel production and other metallurgical operations.

Baghouse dust is a mixture of metal oxides that are collected by scrubbers or electrostatic precipitators in electric arc furnace (EAF) and blast furnace steel-making facilities and in other iron-making plants. According to recent estimates, as cited by W. D. Huskonen in *Metal Producing*, 33.38–39 (October 1989), American EAF steel makers generate about 500,000 tons/year of toxic dust, whose dumping in landfills was to be banned by the U.S. Environmental Protection Agency as of Aug. 8, 1990. This dust contains leachable forms of lead, cadmium, and chromium, whose runoff may enter the groundwater system and contaminate drinking water. It also contains 30–50 weight-% of iron and, in carbon steel production, about 5–50 weight-% of zinc. The amount of zinc in EAF dust is expected to grow due to a) a projected doubling in the amount of zinc that will be used on flat-rolled steel and b) a recent introduction of new galvanizing lines that should cause a four-fold increase in the amount of galvanized scrap to be re-melted.

"Upgrading" of a portion of the dust by raising its zinc content to >50 weight-% would yield a product that could be sold as a raw material to refiners of metallic zinc. However, a large proportion of the zinc in the dust is combined with iron in the form of zinc ferrite, $ZnFe_2O_4$, which cannot be easily decomposed into separate iron and zinc constituents.

It is an object of this invention to provide an energy-efficient and cost-effective process for separating zinc from iron in baghouse dust.

The approaches that have been reportedly considered thus far for recycling or disposing of baghouse dust fall into the following three general categories:

1. Briquetting, pelletizing or otherwise fixating the dust in a leachproof matrix and storing or disposing of the fixated product 2. Reducing the dust with coal, methane or hydrogen at an elevated temperature and separating condensable zinc vapor from a nonvolatile slag, e.g., using a plasma furnace or a flame reactor process.

3. Removing the zinc by a hydrometallurgical process.

The first of these approaches involves inputs of energy, materials, labor, and operating facilities to generate a disposable but nonsellable product. The second approach yields reusable zinc and iron, but necessitates costly, rather large, thermally insulated facilities and considerable energy expenditures. The hydrometallurgical approaches should involve the least costly equipment and the least expenditures of energy, but they may generate excessive amounts of environmentally objectionable chemical effluents.

More particularly, the hydrometallurgical processes that are widely used for recovering zinc from iron-containing ores are based on sequences that include selective dissolution (leaching), precipitation, filtration, and washing. These processes yield high recoveries (about 98%) of zinc, iron, lead, and other ore constituents. However, they generate a voluminous environmentally objectionable waste stream. For instance, one of the most widely used of these processes—the so-called "jarosite process"—comprises leaching the ore with hot dilute sulfuric acid to yield dissolved ferric and zinc sulfates followed by neutralization of the acid to precipitate the iron in form of jarosite. These steps generate a large volume of environmentally objectionable chemical waste.

It is therefore another object of this invention to provide a hydrometallurgical process for recovering zinc and iron from baghouse dust that will offer the advantages of relatively low costs of equipment, energy, and materials, and yet generate no objectionable chemical waste stream.

Other objects of the invention will become apparent to professionals in the environmental, metallurgical, and related areas following perusal of the complete specification.

SUMMARY OF THE INVENTION

Briefly, the invention consists of dissolving the zinc constituents and, especially, breaking up the difficulty soluble zinc ferrite by leaching the dust in hot concentrated sulfuric acid, which yields dissolved zinc sulfate and a precipitate of ferric sulfate, separating the precipitate from the solution by filtration and washing with methanol, recovery of the methanol by distillation, followed by removal of zinc by precipitation and recovery of zinc and sulfuric acid, and recovery of iron and sulfuric acid from the ferric sulfate. The recovery of zinc may be effected by alternative methods, one of which involves addition of a sufficient amount of water to precipitate hydrated zinc sulfate at 10° C., separation of the precipitate from sulfuric acid by filtration, and evaporation of water to regenerate concentrated sulfuric acid. The recovery of iron may also be effected in alternative ways, one of which involves roasting the ferric sulfate to yield ferric oxide and sulfur trioxide, which can be reconverted to concentrated sulfuric acid by hydration. The overall process should not generate any significant waste stream.

BRIEF DESCRIPTION OF THE DRAWING

The invention is best explained with reference to FIG. 1, which is a flow diagram showing the essential steps in the process for recovering iron and zinc from baghouse dust.

DESCRIPTION OF THE PREFERRED EMBODIMENT

Figure 1:
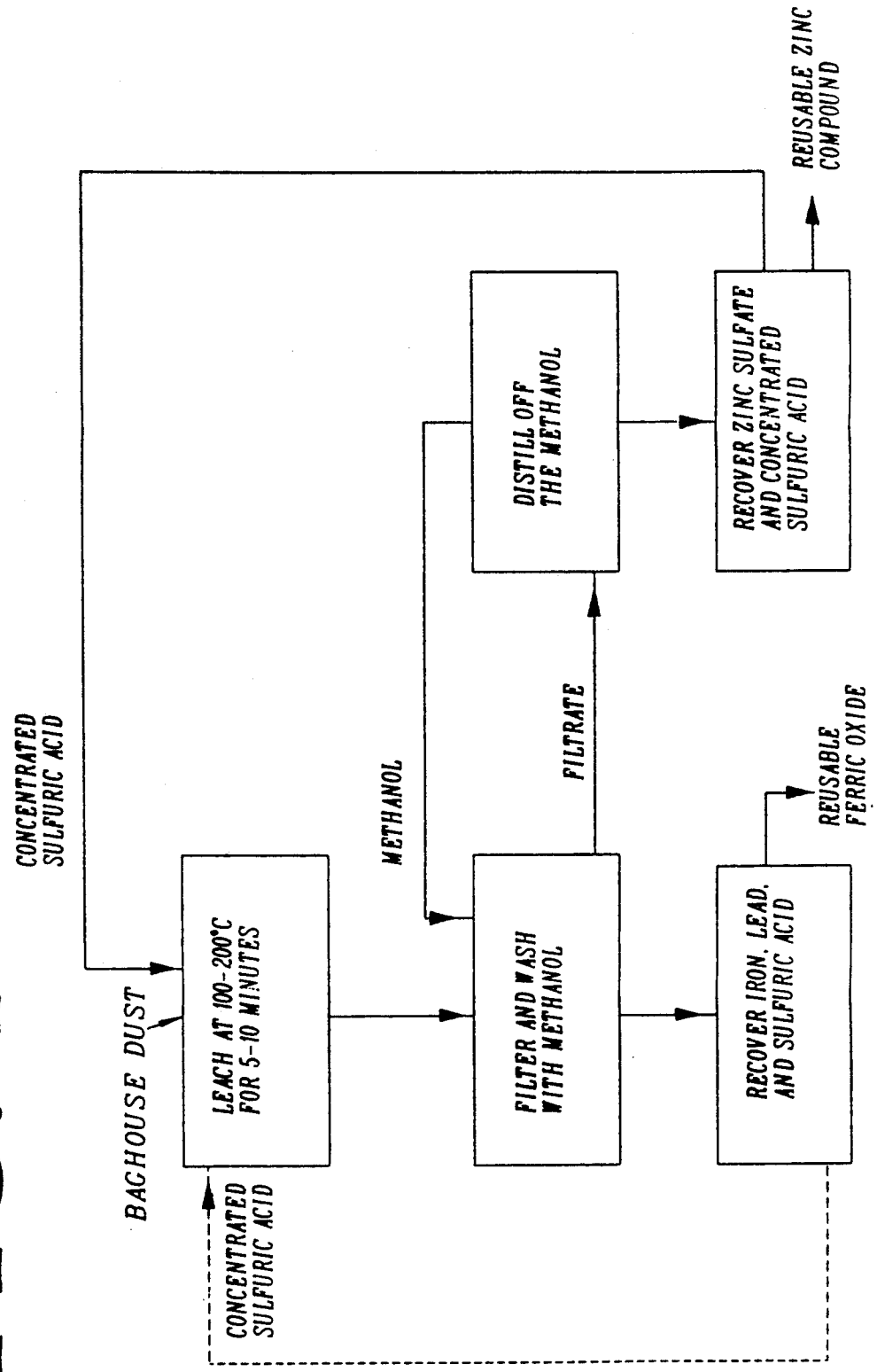

As indicated in FIG. 1, baghouse dust is leached with hot concentrated sulfuric acid, preferably at a temperature in the range of 50°–200° C., for about 5–10 minutes, so as to dissolve the iron- and zinc-containing components and convert them, especially the zinc ferrite, into dissolved zinc sulfate and a white precipitate of ferric sulfate. After cooling to ambient temperature, the resulting thick slurry is fed to a filter where it is washed with methanol to remove the acid solution from the ferric sulfate. The filtrate is then heated to distill off and recycle the methanol, after which the zinc is recovered by any one of several alternative methods, and the concentrated sulfuric acid is reused for leaching more baghouse dust. The ferric sulfate is also processed by any one of several methods that can yield reusable iron and preferably also concentrated sulfuric acid. The overall process should therefore not generate any significant waste stream.

There are various options available in industry for using ferric sulfate either as the sulfate or after converting it to ferric oxide. For instance, roasting of the sulfate yields ferric oxide and sulfur trioxide gas. Hydration of the gas can then regenerate concentrated sulfuric acid for leaching more dust. Alternatively, the ferric sulfate may be reacted with a base, e.g., sodium hydroxide, calcium hydroxide, or ammonia, to yield ferric oxide and a sulfate salt. If concentrated ammonia is used in this reaction, the resulting ammonium sulfate can be thermally decomposed into ammonia and sulfuric acid, both of which can be recycled for use in the same process.

There are also various options of recovering zinc from the concentrated sulfuric acid solution. One option is to use it directly for galvanizing steel in sulfuric acid or for otherwise electrodepositing zinc. Alternatively, addition of water to 80-85% sulfuric acid solution at 10° C. results in the precipitation of hydrated zinc sulfate. Filtration of the hydrate and evaporation of water from the filtrate can then yield neutral zinc sulfate for use in electrolytic production of zinc and concentrated sulfuric acid for reuse in leaching baghouse dust. Another alternative is to roast the zinc sulfate so as to yield zinc oxide and sulfur trioxide, in analogy to the above-suggested roasting of ferric sulfate.

One key feature of the process of FIG. 1 is the use of hot concentrated sulfuric acid in the leaching step. Such an approach was previously believed to be impractical. For instance, in U.S. Pat. No. 4,610,722, issued on Sep. 9, 1986, to W. P. C. Duyvesteyn and R. F. Hogsett, entitled "Process for Metal Recovery from Steel Plant Dust," it is stated as follows in Column 4, Lines 47-50:

"Straight sulfuric acid leaching is not desirable in that it produces a residue that is very difficult to separate from the liquid phase."

The cited difficulty was overcome in the present process by washing the residue with methanol. Of course, other low-boiling liquids, such as acetone, may be used in lieu of the methanol to achieve the desired separation of the residue from the sulfuric acid.

The validity of the foregoing process is substantiated by the following

EXAMPLE 1

A sample of 1 g of $ZnFe_2O_4$ was mixed with 5 mL of hot concentrated sulfuric acid for 5 minutes. The resulting slurry of white ferric sulfate in concentrated acid was placed on a filter and washed with 40 mL of methanol. Two portions of the filtrate were analyzed for zinc and iron and found to contain an iron/zinc weight ratio of 0.07+/−0.03. The ferric sulfate precipitate was dissolved in 5 mL of 12M NaOH and portions of the resulting solution were also analyzed for iron and zinc. The measured iron/zinc weight ratio was 18.15+/−0.05. The Fe/Zn weight ratio was thus changed from 1.71 in the original sample to >18 in the iron-rich precipitate and to about 0.07 in the zinc-rich filtrate. The purity of the zinc that can be recovered from this filtrate should thus be in excess of 90%, which is well in excess of the 50% purity that was considered essential for a commercially useful product.

Example 1 also shows a ten-fold reduction in the zinc/iron ratio of the precipitated fraction. Therefore, a baghouse dust sample containing <20% of zinc should yield an iron-rich fraction having <2% of zinc, which may be directly reusable in many steel-making operations.

The afore-described process offers the advantages of reduced energy consumption and equipment costs that are associated with hydrometallurgical processes as compared with high-temperature operations, while avoiding the generation of an excessive waste stream.

Of course, there may be many variations and modifications introduced in this process. The recovery options will depend on purity requirements for reuse or safe disposal. Special process steps may be introduced for reuse or safe disposal of lead, cadmium, chromium, and other toxic impurities. All of these variations and modifications will remain within the scope of this invention is defined by the following claims.

We claim:

1. In the treatment of baghouse dust that is generated in various metallurgical industries, the process of separating zinc-rich and iron-rich fractions from said dust which comprises the steps of:
   leaching the dust by hot concentrated sulfuric acid so as to generate dissolved zinc sulfate and a precipitate of iron sulfate;
   separating the precipitate from the acid by filtration and washing with a volatile liquid; and
   collecting the filtered acid and the washings into a concentrated sulfuric acid filtrate fraction.

2. The process of claim 1, wherein said volatile liquid is recovered from the filtrate fraction by distillation.

3. The process of claim 2, wherein said volatile liquid is methanol or acetone.

4. The process of claim 1, wherein said hot acid is at a temperature of at least 100° C.

5. The process of claim 4, wherein said temperature is in the range of 100°-200° C.

6. The process of claim 5, wherein said leaching step lasts at least five minutes.

7. The process of claim 2, wherein the recovered liquid is reused in the washing step.

8. The process of claim 2, comprising the further step of recovering a zinc compound and concentrated sulfuric acid from the filtrate fraction.

9. The process of claim 1, comprising the further step of recovering an iron compound from said precipitate.

10. The process of claim 9, wherein said recovery step comprises roasting the iron sulfate to yield iron oxide and sulfur trioxide and hydrating the trioxide to yield concentrated sulfuric acid.

11. The process of claim 9, wherein said recovery step comprises treating the iron sulfate with a base so as to yield iron oxide and a sulfate salt.

12. The process of claim 11, wherein said base comprises sodium hydroxide, calcium hydroxide or ammonia.

13. The process of claim 12, wherein said base comprises ammonia so as to yield ammonium sulfate, and comprising the step of thermally decomposing the sulfate into ammonia and sulfuric acid.

14. The process of claim 8, wherein said recovery step comprises the steps of:
- adding water to the filtrate to reduce the concentration of sulfuric acid to between 80% and 85%;
- cooling the solution to about 10° C. so as to precipitate hydrated zinc sulfate;
- filtering the precipitate to obtain a zinc sulfate fraction and an 80–85% sulfuric acid fraction; and
- evaporating water from the acid fraction to obtain reusable concentrated sulfuric acid.

15. The process of claim 14, comprising the additional steps of roasting the sulfate fraction to produce zinc oxide and a vapor fraction of sulfur trioxide and water and adjusting the water content of the vapor fraction to produce concentrated sulfuric acid.

* * * * *